United States Patent Office 2,944,882
Patented July 12, 1960

2,944,882

PROCESS OF PRODUCING A PHOSPHATE FERTILIZER

Pieter J. van den Berg, Sittard, and Johannes W. M. Steeman, Beek, Netherlands, assignors to Stamicarbon N.V., Heerlen, Netherlands No Drawing. Filed Feb. 5, 1957, Ser. No. 638,201

Claims priority, application Netherlands Feb. 8, 1956

6 Claims. (Cl. 71—39)

The present invention relates to a process of preparing a fertilizer containing nitrogen and phosphate, the latter being highly soluble in ammonium citrate solution.

It is a known procedure to decompose a natural phosphate by means of nitric acid and then to precipitate calcium fluoride—if any be present—and dicalcium phosphate by introducing gaseous ammonia into the solution, and subsequently to convert the still remaining, highly hygroscopic calcium nitrate into ammonium nitrate by further addition of gaseous ammonia and carbon dioxide (or ammonium carbonate or bicarbonate).

In this manner, a fertilizer is obtained which, besides dicalcium phosphate and ammonium nitrate, contains a large quantity of very finely divided calcium carbonate.

A disadvantage of this fertilizer is that, although the dicalcium phosphate is at first completely soluble in an ammonium citrate solution, its ammonium citrate-solubility tends to fall off in the soil due to a reaction between the dicalcium phosphate and the finely divided calcium carbonate, resulting in the formation of apatite which is absorbed with difficulty by the plants.

Applicants have discovered that a fertilizer with a high and lasting ammonium citrate-solubility can be obtained if, in preparing the fertilizer, sulphur dioxide, ammonium sulphite or ammonium bisulphite are substituted for the carbon dioxide, ammonium carbonate, or ammonium bicarbonate. The fertilizer thus obtained then consists of a mixture of dicalcium phosphate, ammonium nitrate and calcium sulphite. In using the novel fertilizer of the present invention, it is found that no reactions take place in the soil which cause a retrogression in ammonium citrate-solubility.

In the U.S. Patent No. 2,555,634, issued June 5, 1951, there is described a method for producing calcium phosphate fertilizer, according to which the decomposition liquor obtained by dissolving raw phosphate with the aid of an acid, e.g. nitric acid, is neutralized either by introducing simultaneously gaseous ammonia and sulphur dioxide or by adding ammonium sulphite or bisulphite.

However, in contrast to what takes place in the process according to the present invention, the above patented procedure does not yield a dicalcium phosphate precipitate, but a phosphate precipitate having an apatite structure. The invention of the present process offers the advantage that the phosphate is precipitated in the form of dicalcium phosphate, a product with which the users are familiar, in contrast to the phosphate apatite fertilizer of the patented process in which the $P_2O_5$ is present in an unusual form.

In the process according to the invention, the raw phosphate is dissolved in such a quantity of nitric acid as to yield a decomposition liquor with a molar $NO_3/CaO$ ratio of approximately 2. The acid solution is then neutralized by introducing $NH_3$ in such a way that the fluoride present is precipitated as $CaF_2$ and the phosphoric acid as dicalcium phosphate. This process is preferably carried out as a continuous operation by simultaneously introducing the acid decomposition liquor and the gaseous ammonia into a reservoir provided with an overflow, and which reservoir is already filled with neutralized decomposition liquor.

In order to precipitate ammonium citrate-soluble dicalcium phosphate, it is desirable that the continuous neutralization with $NH_3$ take place in such a way as to obtain a suspension of $CaF_2$ and $CaHPO_4$ in a partly neutralized decomposition liquor of calcium nitrate and ammonium nitrate having a molar $NH_3/NO_3$ ratio of approximately 0.6.

The weak acid mixture thus obtained is further neutralized—after evaporation of water, if necessary—and converted with $NH_3 + SO_2$, following which the mass is granulated and dried.

The invention is further illustrated by the following examples which, however, are not given by way of limitation:

Example 1

1000 kgs. of Kouribgha phosphate containing 33.8% $P_2O_5$, 51.7% CaO and 4.65% F are decomposed with 1900 kgs. nitric acid containing 55% by weight of $HNO_3$. The molar $NO_3/CaO$ ratio in the decomposition liquor is 1.8. This decomposition liquor is continuously neutralized with 165 kgs. $NH_3$—all the above and following quantities being calculated on the basis of 1000 kgs. raw phosphate—with the result that the molar $NH_3/NO_3$ ratio in the partly neutralized mass becomes 0.586.

The neutralization is then completed by simultaneously introducing 120 kgs. $NH_3$ and 200 kgs. $SO_2$, with the result that the molar $NH_3/NO_3$ ratio in the mass rises to approximately 1. The mass, which still contains 20% water, is then mixed with a sufficient amount of dry, screened grit originating from a similar previous process to enable it to be granulated, after which the granules are further dried with hot air to a moisture content of 1%.

On analysis it is found that, in addition to 18.6% N, the granules contain 13.6% $P_2O_5$ which is almost entirely present as dicalcium phosphate, and 99.3% of which is soluble in a 2% ammonium citrate solution.

Example 2

1000 kgs. of Florida pebble phosphate containing 34.0% by weight of $P_2O_5$, 48.1% by weight of CaO and 3.5% by weight of F are decomposed with 1655 kgs. nitric acid containing 55% by weight of $HNO_3$, yielding a decomposition liquor with a molar $NO_3/CaO$ ratio of 1.65.

The liquid mass is continuously neutralized with $NH_3$ by introducing therein 162 kgs. $NH_3$ per 1000 kgs. raw phosphate, obtaining thereby a molar $NH_3/NO_3$ ratio of 0.65.

The resultant weak acid suspension of dicalcium phosphate in a mixture of ammonium nitrate and calcium nitrate solution is thereafter slightly concentrated by evaporation, and then treated with 75 kgs. $NH_3$ and 180 kgs. $SO_2$, yielding an ammonium nitrate mass containing approximately 20% water, in which are suspended dicalcium phosphate and calcium sulphite. This mass is then granulated and dried in the way described in Example 1. The end product then contains 18.5% N and 16% $P_2O_5$, 98.7% of which is soluble in a 2% ammonium citrate solution.

Obviously, a quantity of potassium salt can be added to the neutralized mass prior to granulation and drying in order to obtain an N. P. K. fertilizer.

We claim:
1. A process of producing from raw calcium phosphate a fertilizer containing ammonium nitrate, calcium sulphite and dicalcium phosphate, comprising the steps of: treating the raw phosphate with nitric acid in amount sufficient to dissolve all the $P_2O_5$ and produce an acid decomposition liquor with a molar $NO_3/CaO$ ratio within the range of 1.5–2; neutralizing the said acid liquor with $NH_3$ to obtain a suspension comprising precipitated dicalcium phosphate in a solution of calcium nitrate and ammonium nitrate having a molar $NH_3/NO_3$ ratio of about 0.6; thereafter completely neutralizing said suspension by contacting it with a reagent selected from the group consisting of ammonium sulphite, ammonium bisulphite, and a mixture of $NH_3+SO_2$, the dicalcium phosphate in said suspension remaining substantially unchanged, and the calcium nitrate in the suspension being converted into $NH_4NO_3$ and $CaSO_3$; thereafter drying said neutralized mass, and recovering the dried mass forming the above mentioned fertilizer.

2. A process according to claim 1 wherein, prior to the drying operation, the neutralized mass is mixed with dried, finely divided fertilizer material resulting from a similar process, and the mixture is granulated.

3. Process according to claim 1, wherein the suspension comprises calcium fluoride.

4. A process according to claim 1, wherein the suspension is concentrated prior to complete neutralization.

5. Process according to claim 1, wherein the acid liquor is neutralized continuously by simultaneously introducing streams of the acid liquor and $NH_3$ into a contacting vessel.

6. A granular fertilizer containing ammonium nitrate, calcium sulphite and dicalcium phosphate, wherein the latter is substantially completely soluble in an ammonium citrate solution, and produced by the following steps: treating a raw phosphate with nitric acid in amount sufficient to dissolve all the $P_2O_5$ and produce an acid decomposition liquor with a molar $NO_3/CaO$ ratio within the range of 1.5–2; neutralizing the said acid liquor with $NH_3$ to obtain a suspension comprising precipitated dicalcium phosphate in a solution of calcium nitrate and ammonium nitrate having a molar $NH_3/NO_3$ ratio of about 0.6; thereafter completely neutralizing said suspension by contacting it with a reagent selected from the group consisting of ammonium sulphite, ammonium bisulphite, and a mixture of $NH_3+SO_2$, the dicalcium phosphate in said suspension remaining substantially unchanged, and the calcium nitrate in the suspension being converted into $NH_4NO_3$ and $CaSO_3$; thereafter drying said neutralized mass, and recovering the dried mass forming the above mentioned fertilizer.

References Cited in the file of this patent

UNITED STATES PATENTS

| | | |
|---|---|---|
| 2,555,634 | De Bruijn | June 5, 1951 |
| 2,673,796 | Percy | Mar. 30, 1954 |

FOREIGN PATENTS

| | | |
|---|---|---|
| 640,149 | Great Britain | July 12, 1950 |